(12) United States Patent
Minami et al.

(10) Patent No.: US 7,888,282 B2
(45) Date of Patent: Feb. 15, 2011

(54) CATALYST FOR MANUFACTURING SYNTHESIS GAS AND METHOD OF MANUFACTURING SYNTHESIS GAS USING THE SAME

(75) Inventors: Takeshi Minami, Yokohama (JP); Kenichi Imagawa, Yokohama (JP); Atsuro Nagumo, Yokohama (JP); Tetsuro Matsumura, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 25 days.

(21) Appl. No.: 10/583,152

(22) PCT Filed: Dec. 8, 2004

(86) PCT No.: PCT/JP2004/018691

§ 371 (c)(1),
(2), (4) Date: Jun. 16, 2006

(87) PCT Pub. No.: WO2005/058495

PCT Pub. Date: Jun. 30, 2005

(65) Prior Publication Data

US 2007/0129245 A1 Jun. 7, 2007

(30) Foreign Application Priority Data

Dec. 18, 2003 (JP) ............................. 2003-421138
Dec. 18, 2003 (JP) ............................. 2003-421139
Sep. 27, 2004 (JP) ............................. 2004-278759
Sep. 27, 2004 (JP) ............................. 2004-278760

(51) Int. Cl.
*B01J 21/06* (2006.01)
*B01J 23/10* (2006.01)
*B01J 23/02* (2006.01)
*B01J 23/46* (2006.01)
*B01J 23/56* (2006.01)
*B01J 23/58* (2006.01)
*B01J 23/63* (2006.01)

(52) U.S. Cl. ............... 502/304; 502/302; 502/325; 502/326; 502/340; 502/349; 423/213.5; 423/245.1

(58) Field of Classification Search ............... 502/302, 502/304, 325, 326, 340, 349; 518/718; 423/213.5, 423/245.1

See application file for complete search history.

(56) References Cited

U.S. PATENT DOCUMENTS

| 3,976,599 | A | * | 8/1976 | Whelan ............... 502/303 |
| 4,294,726 | A | | 10/1981 | Bozon et al. |
| 5,130,109 | A | | 7/1992 | Wan |
| 5,490,977 | A | | 2/1996 | Wan et al. |
| 5,597,771 | A | | 1/1997 | Hu et al. |
| 5,898,014 | A | * | 4/1999 | Wu et al. ............... 502/302 |
| 5,989,507 | A | | 11/1999 | Sung et al. |
| 6,376,423 | B2 | * | 4/2002 | Yagi et al. ............... 502/326 |
| 2002/0115730 | A1 | * | 8/2002 | Allison et al. ............... 518/703 |
| 2003/0125202 | A1 | | 7/2003 | Ruwisch et al. |
| 2003/0177763 | A1 | | 9/2003 | Twigg et al. |
| 2003/0180215 | A1 | * | 9/2003 | Niu et al. ............... 423/651 |

FOREIGN PATENT DOCUMENTS

| EP | 0718028 B1 | 6/1996 |
| EP | 0 885 650 A2 | 12/1998 |
| EP | 1 004 347 A2 | 5/2000 |
| WO | WO 95/35152 A | 12/1995 |
| WO | WO 01/36323 A2 | 5/2001 |

OTHER PUBLICATIONS

Chinese Office Action dated Apr. 4, 2008 issued in corresponding Application No. 200480037693.6.
International Search Report of PCT/JP2004/018691, date of mailing May 6, 2005.

* cited by examiner

*Primary Examiner*—Timothy C Vanoy
*Assistant Examiner*—Diana J Liao
(74) *Attorney, Agent, or Firm*—Westerman, Hattori, Daniels & Adrian, LLP

(57) ABSTRACT

A catalyst for manufacturing synthesis gas has a carrier and a Group VIII metal carried by the carrier. The carrier contains a first ingredient, a second ingredient and a third ingredient. The first ingredient is an oxide of at least an alkaline earth metal selected from the group of magnesium, calcium, strontium and barium. The second ingredient is an oxide of at least an element selected from the group of scandium, yttrium and lanthanoids. The third ingredient is zirconia or a substance containing zirconia as principal ingredient and has a solid electrolytic property. The carrier may be formed by forming an overcoat film on a substrate by coating. Then, the overcoat film contains the above three ingredients. A catalyst according to the invention can remarkably reduce the dimensions of the reaction facility and improve the energy efficiency of the facility.

17 Claims, No Drawings

CATALYST FOR MANUFACTURING SYNTHESIS GAS AND METHOD OF MANUFACTURING SYNTHESIS GAS USING THE SAME

TECHNICAL FIELD

This invention relates to a catalyst for manufacturing synthesis gas containing carbon monoxide (CO) and hydrogen ($H_2$) as principal ingredients from feedstock gas containing hydrocarbon gas having 1 to 5 carbon atoms in each molecule such as natural gas and oxygen ($O_2$) and also to a method of manufacturing synthesis gas by using such a catalyst.

BACKGROUND ART

Natural gas is attracting attention as energy source that could substitute for petroleum in future. Since natural gas has combustion characteristics that make itself cleaner than other fossil fuels, it will be highly beneficial to promote the use of natural gas as source of both primary energy and secondary energy from the viewpoint of protection of environment.

From this point of view, massive efforts are currently being paid for the development of technologies for manufacturing methanol, DME (dimethylether) and synthetic oil as well as other substances by way of chemical conversion of natural gas. The so-called indirect conversion method of using synthesis gas that makes a starting material for synthesis is in the mainstream of the technological development. The technologies for manufacturing synthesis gas take an important role in the entire conversion process from the viewpoint of economy.

Known processes for manufacturing synthesis gas include among others (1) the steam reforming process, (2) the ATR (auto thermal reforming) process and (3) the CPOX (catalytic partial oxidation) process.

Since the reaction of the steam reforming process is endothermic, it is necessary to arrange a reaction tube in the furnace of the reforming facility and externally supply heat necessary for reforming. Since heat needs to be supplied at a determined rate, the dimensions of the facility have to be increased proportionally relative to the manufacturing scale. In other words, this process provides little or no scale merit and hence is not suited for large scale manufacturing. While the carbon dioxide reforming that can convert carbon dioxide with steam into synthesis gas is also known, it is accompanied by a similar problem.

The ATR process is a self-heating type reaction process, where oxygen gas is added to the feedstock gas for partial combustion and the heat generated by the combustion is utilized for the following reforming reaction that is an endothermic reaction. In the ATR process, the hydrocarbon in the feedstock gas is partly burned by means of a burner and the generated hot combustion gas (principally containing steam and carbon dioxide that are combustion products as well as unburned feedstock gas) is reformed by a catalyst layer. While this process allows to reduce the dimensions of the facility if compared with the steam reforming process, the facility is still large if it is used for GTL (gas to liquid) production. Therefore, efforts are required to downsize the facility. Additionally, with the ATR process, it is difficult to run the facility in economically optimal conditions because steam needs to be supplied in excess in order to prevent the burner from terminating its service life prematurely and for other reasons.

Finally, the catalytic partial oxidation process is a process of catalytic combustion of a part of material hydrocarbon (which is mainly methane) with a catalyst and reforming the produced hot combustion gas in the same catalyst layer immediately thereafter. While this process is still under investigation and development, it involves only a simple mechanism and is promising in terms of thermal efficiency and productivity. Additionally, it shows a satisfactory reaction performance if the GHSV (gas hourly space velocity) is raised by one digit from the steam reforming process and the ATR process to make it sufficiently adaptable to large scale manufacture. However, the catalytic partial oxidation process is accompanied by a problem that generation of heat is apt to be concentrated near the entrance of the catalyst layer (to produce a so-called hot spot) and therefore sufficient measures need to be taken to prevent the catalyst from being degraded due to high temperatures and the reactor from being damaged.

The generation of a hot spot near the entrance of the catalyst layer in the catalytic partial oxidation process is attributable to that the process for manufacturing synthesis gas involves a two stage reaction system that includes a reaction of partial combustion of methane which is a principal ingredient of the feedstock gas (an exothermic reaction of producing heat at a rate of about 800 kJ/mol) and a subsequent steam reforming reaction of combustion gas (an endothermic reaction of absorbing heat at a rate of about 250 kJ/mol) and a carbon dioxide reforming reaction (an endothermic reaction of absorbing heat at a rate of about 200 kJ/mol) and the heat generation rate at the former stage is very high. If such a reaction system is realized by way of direct catalytic partial oxidation, or a direct reaction system expressed by formula (1) below (an endothermic reaction of producing heat at a rate of about 30 kJ/mol), it will be possible to establish a process that can avoid generation of a hot spot.

$$CH_4 + 1/2 O_2 \rightarrow CO + 2H_2 \qquad (1)$$

The above background art is described in International Publications WO97/37929 and WO01/36323 to list a few.

DISCLOSURE OF THE INVENTION

Development of a catalyst and a process that are highly selective is required in order to realize the direct catalytic partial oxidation as expressed by the above formula (1). However, no report has been made to date on the industrial success of such development.

In view of the above identified circumstances, it is therefore an object of the present invention to provide a novel catalyst for manufacturing synthesis gas that can realize direct catalytic partial oxidation as expressed by the above formula (1) of suppressing complete oxidation on the way and a novel method of manufacturing synthesis gas, using such a catalyst.

When manufacturing synthesis gas on a large scale by way of a catalytic partial oxidation process and by raising the gas hourly space velocity, it is difficult to design a facility that uses a packed bed type catalyst layer because of a too large pressure loss it involves. While known carriers that produce only a small pressure loss include honeycomb structures and other similar structures as well as porous bodies such as foamed bodies, such structures and bodies are structurally complex and hence currently only limited number of easily moldable materials such as alumina and stabilized zirconia can be used for them. If carriers of any of these materials are made to directly carry a Group VIII metal such as Rh to form a catalyst, the catalytic partial oxidation process that uses such a catalyst is not commercially feasible because of a low conversion rate and a low selectivity. Particularly, alumina and zirconia can easily give rise to side reactions because they have weak acidic characteristic on the surface and provide only a low conversion rate and a low selectivity. Additionally, they easily produce carbon deposition.

Therefore, another object of the present invention is to provide a catalyst that can produce a structure showing a high conversion rate, a high selectivity and an enhanced degree of resistance against carbon deposition and at the same time adapted to situations where a very large gas flow rate is required to curtail the contact time to less than $30 \times 10^{-3}$ sec without involving a large pressure loss.

According to the invention, the above objects are achieved by providing a catalyst for manufacturing synthesis gas containing carbon monoxide and hydrogen as principal ingredients from feedstock gas containing hydrocarbon having 1 to 5 carbon atoms in each molecule and oxygen. The catalyst for manufacturing synthesis gas has a carrier and a Group VIII metal carried by the carrier; said carrier containing a first ingredient, a second ingredient and a third ingredient; said first ingredient being an oxide of at least an alkaline earth metal selected from the group of magnesium (Mg), calcium (Ca), strontium (Sr) and barium (Ba); said second ingredient being an oxide of at least an element selected from the group of scandium (Sc), yttrium (Y) and lanthanoids; said third ingredient being zirconia or a substance containing zirconia as principal ingredient and having a solid electrolytic property.

Preferably, the molar ratio of said second ingredient relative to said first ingredient is between 0.02 and 0.40 and the molar ratio of said third ingredient relative to said first ingredient is between 0.04 and 1.5.

Preferably, said first ingredient is magnesia (MgO) or magnesia that contains calcia (CaO).

Preferably, said second ingredient is an oxide of at least an element selected from the group of scandium (Sc), yttrium (Y), lanthanum (La), cerium (Ce), praseodymium (Pr), neodymium (Nd) and samarium (Sm).

More preferably, said second ingredient is an oxide of cerium (Ce).

Preferably, said third ingredient is at least a substance selected from the group of zirconia, calcium-stabilized zirconia, magnesium-stabilized zirconia, yttrium-stabilized zirconia, scandium-stabilized zirconia and cerium-stabilized zirconia.

More preferably, said third ingredient is zirconia or calcium-stabilized zirconia.

Preferably, said carrier comprises a porous body that operates as substrate for the carrier and an overcoat film formed on the porous body by coating and said overcoat film contains said first ingredient, said second ingredient and said third ingredient.

Preferably, said porous body is made of at least a substance selected from ceramic foam and ceramic honeycomb.

Preferably, said porous body is made of ceramic foam and has a mesh structure of 10 to 40 cells per inch.

Preferably, said porous body is made of ceramic honeycomb and has a structure of 100 to 400 cells per square inch.

Preferably, said Group VIII metal is at least a metal selected from the group of rhodium (Rh), platinum (pt), palladium (Pd), ruthenium (Ru) and iridium (Ir).

More preferably, said Group VIII metal is rhodium (Rh).

Preferably, said Group VIII metal is carried by the carrier at a rate of 100 to 50,000 weight ppm per unit weight of the carrier.

Preferably, said Group VIII metal is carried by the carrier at a rate of $2 \times 10^{-7}$ to $5 \times 10^{-3}$ mol/m$^2$ per unit surface area of the carrier.

In another aspect of the present invention, there is provided a method of manufacturing synthesis gas containing carbon monoxide (CO) and hydrogen (H$_2$) as principal ingredients by causing feedstock gas containing hydrocarbon having 1 to 5 carbon atoms in each molecule and oxygen (O$_2$) to contact a catalyst for manufacturing synthesis gas, characterized in that the catalyst for manufacturing synthesis gas has a carrier and a Group VIII metal carried by the carrier; said carrier containing a first ingredient, a second ingredient and a third ingredient; said first ingredient being an oxide of at least an alkaline earth metal selected from the group of magnesium (Mg), calcium (Ca), strontium (Sr) and barium (Ba); said second ingredient being an oxide of at least an element selected from the group of scandium (Sc), yttrium (Y) and lanthanoids; said third ingredient being zirconia or a substance containing zirconia as principal ingredient and having a solid electrolytic property.

Preferably, the molar ratio of said second ingredient relative to said first ingredient is between 0.02 and 0.40 and the molar ratio of said third ingredient relative to said first ingredient is between 0.04 and 1.5.

Preferably, when the molar number of carbon deriving from feedstock hydrocarbon is expressed by C, the ratio of O$_2$/C in the feedstock gas is within the range from 0.3 to 0.6, the gas temperature at the inlet of the catalyst layer filled with the catalyst for manufacturing synthesis gas is so regulated as to be between 100 and 500° C. and the gas temperature at the outlet of the catalyst layer is so regulated as to be between 600 and 1200° C. while the gas pressure at the inlet of the catalyst layer is so regulated as to be between 0.1 MPa and 10 MPa.

Preferably, with a method for manufacturing synthesis gas according to the invention, the contact time (t) is defined to be within a range between $5 \times 10^{-4}$ and $3 \times 10^{-2}$ (sec).

Thus, according to the invention, there is provided a novel catalyst for manufacturing synthesis gas that enables to realize direct catalytic partial oxidation and hence it is now possible to establish a synthesis gas manufacturing process using a catalytic partial oxidation method for natural gas, for which no success has ever been reported. Additionally, as such a process is realized, it is possible to remarkably reduce the dimensions of a synthesis gas manufacturing facility if compared with facilities using known synthesis gas manufacturing technologies (e.g., the steam reforming process and the ATR process) and also improve the thermal efficiency. Particularly, it is possible to realize a process suited for manufacturing synthesis gas such as GTL on a large scale.

BEST MODE FOR CARRYING OUT THE INVENTION

A catalyst for manufacturing synthesis gas and a method of manufacturing synthesis gas according to the invention will be described in greater detail below.

(1) Catalyst for Manufacturing Synthesis Gas

A catalyst for manufacturing synthesis gas according to the invention is to be used when manufacturing synthesis gas containing carbon monoxide (CO) and hydrogen (H$_2$) as principal ingredients from feedstock gas containing hydrocarbon having 1 to 5 carbon atoms in each molecule and oxygen (O$_2$).

A catalyst for manufacturing synthesis gas according to the invention has a carrier and a Group VIII metal carried by the carrier.

The carrier contains a first ingredient, a second ingredient and a third ingredient.

The first ingredient contained in the carrier is an oxide of at least an alkaline earth metal selected from the group of magnesium (Mg), calcium (Ca), strontium (Sr) and barium (Ba). Among these oxides, it is preferable that the first ingredient is magnesia (MgO) or magnesia that contains calcia (CaO).

The second ingredient contained in the carrier is an oxide of at least an element selected from the group of scandium (Sc), yttrium (Y) and lanthanoids. More specifically, the second ingredient is an oxide of at least an element selected from the group of scandium (Sc), yttrium (Y), lanthanum (La), cerium (Ce), praseodymium (Pr), neodymium (Nd) and samarium (Sm). Among these oxides, it is preferable that the second ingredient is an oxide of cerium (Ce).

The third ingredient contained in the carrier is at least a substance selected from the group of zirconia, calcium-stabilized zirconia, magnesium-stabilized zirconia, yttrium-stabilized zirconia, scandium-stabilized zirconia and cerium-stabilized zirconia. Among these substances, it is preferable that the third ingredient is zirconia or calcium-stabilized zirconia.

The content ratio of the first ingredient, the second ingredient and the third ingredient is defined as follows. The molar ratio of the second ingredient relative to the first ingredient is preferably between 0.02 and 0.40, more preferably between 0.08 and 0.30, still more preferably between 0.10 and 0.25. The molar ratio of the third ingredient relative to the first ingredient is preferably between 0.04 and 1.5, more preferably between 0.2 and 1.0, still more preferably between 0.3 and 0.6.

The conversion rate of feedstock hydrocarbon tends to fall when the molar ratio of the second ingredient relative to the first ingredient is too small and smaller than 0.02. The conversion rate of feedstock hydrocarbon also tends to fall when the molar ratio is too large and exceeds 0.40.

Both the selectivity of generating hydrogen and that of generating carbon monoxide tend to fall when the molar ratio of the third ingredient relative to the first ingredient is too small and smaller than 0.04. The conversion rate of feedstock hydrocarbon and the selectivity of generating hydrogen tend to fall when the ratio is too large and exceeds 1.5.

The carrier containing the above three ingredients is manufactured firstly by weighing the ingredients to obtain a predetermined composition and subsequently causing the composition to sequentially go through a mixing step, a compression/molding step and a baking step. If necessary, a binder is added to and mixed with the powdery composition in the compression/molding step. The specific surface area of the manufactured carrier is 0.1 to 5 $m^2/g$, preferably 0.2 to 1 $m^2/g$. The specific surface area as used herein is the BET specific surface area measured by adsorption of nitrogen.

The carrier may be powdery, granular, spherical, cylindrical or tubular. The shape of the carrier may be selected appropriately depending on the type of the catalyst bed to be used.

For the purpose of the present invention, the carrier may be made to comprise a porous body that operates as substrate for the carrier and an overcoat film formed on the porous body by coating.

Preferably, the porous body that operates as substrate for the carrier is made of at least a substance selected from ceramic foam having a three-dimensional mesh structure and ceramic honeycomb having a grid-like structure, although a ceramic porous plate having a two-dimensional mesh structure (e.g., Repton available from Kikusui Chemical Industries Co., Ltd.) may alternatively be used for the porous body.

A porous body having a uniform and continuous three-dimensional mesh structure that is remarkably characterized by the pore structure thereof is obtained when meshed soft polyurethane foam is used as starting base material for ceramic foam. The basic structure of ceramic foam is obtained by coating the surface of the skeleton of meshed urethane foam with a ceramic material and baking or sintering the coated urethane foam to burn out the urethane foam part until only the ceramic part is left. Thus, the porosity of such a porous body is as high as 80 to 90%. Furthermore, it is possible to regulate the thermal resistance, the impact resistance, the strength, the pressure loss and other properties of the porous body by selecting an appropriate ceramic material.

The above mesh structure of the ceramic foam has about 10 to 40 cells per inch (obtained by averaging the numbers of air bubbles arranged on straight lines of 25.4 mm), preferably about 20 to 30 cells per inch.

The material of the ceramic foam is selected from the group of materials including alumina, cordierite, alumina/cordierite, silicon carbide, mullite and alumina/zirconia.

On the other hand, ceramic honeycomb is normally produced by extrusion molding and has a plurality of longitudinal pores running along the axis of a body having a profile of a cylinder, an elliptic cylinder or a prism. Therefore, many physical properties of ceramic honeycomb are directional unlike ceramic foam. The above cited materials that can be used for ceramic foam also can be used for ceramic honeycomb for the purpose of the invention. Preferably, the porous structure of ceramic honeycomb has 100 to 400 cells per square inch.

The overcoat film that is laid on a porous body and constitutes the outer member of the carrier contains the first ingredient, the second ingredient and the third ingredient.

A technique as described below is preferably used for forming an overcoat film containing the above three ingredients on a porous body. Firstly, a slurry containing the elements of the first ingredient, the second ingredient and the third ingredient in the form of hydroxides or oxides to a predetermined content ratio is prepared and an operation of dipping a porous body (e.g., ceramic foam) into the slurry and pulling it up for drying is conducted once or repeated for several times to produce a film coat. Subsequently, a desired overcoat film is formed by baking the porous body at high temperature of about 1,000° C. The slurry may be sprayed on the porous body when forming a film coat on a large porous body. The three ingredients may be coated separately. More specifically, a film coat of MgO may be formed and subsequently a $CeO_2$ film coat and a $ZrO_2$ film coat may be formed. Alternatively, they may be formed the other way round. Slurries of the three ingredients may be sequentially used to form the overcoat film or the process of using slurries of the three ingredients may be repeated for several times.

The Group VIII metal is carried on the surface of the carrier formed in a manner as described above to produce a catalyst according to the invention.

The Group VIII metal may be carried in the state of metal or in the state of a metal compound such as oxide.

Preferably, the Group VIII metal is at least a metal selected from the group of rhodium (Rh), platinum (Pt), palladium (Pd), Ruthenium (Ru) and iridium (Ir). Particularly, it is highly preferably to use rhodium (Rh).

The Group VIII metal is carried by the carrier preferably at a rate of 100 to 50,000 weight ppm, more preferably at a rate of 500 to 5,000 weight ppm, still more preferably at a rate of 700 to 3,000 weight ppm per unit weight of the carrier. The reaction speed tends to fall and the conversion rate also tends to fall when the rate is less than 100 weight ppm per unit weight of the carrier. The reactivity does not show any improvement when the rate exceeds 50,000 weight ppm per unit weight of the carrier. Therefore, it is normally preferable that the Group VIII metal is carried by the carrier at a rate of 100 to 50,000 weight ppm per unit weight of the carrier from the viewpoint of effective use of the carried Group VIII metal.

In other words, the Group VIII metal is carried by the carrier at a rate of $2 \times 10^{-7}$ to $5 \times 10^{-3}$ mol/m$^2$ per unit surface area of the carrier.

The Group VIII metal can be made to be carried by any of the known ordinary methods. One of the preferable methods that can be used for the purpose of the present invention is the impregnation method. When a catalyst according to the invention is prepared by the impregnation method, the carrier is dipped into a solution containing the catalyst metal. Then, the carrier carrying the metal oxide is separated form the mother solution, dried and baked.

A method of adding a metal salt solution by an amount good for the specific surface area of the carrier little by little by dropping or spraying to make the surface of the carrier uniformly wet and subsequently drying and baking the carrier (incipient-wetness method) is also effective.

When any of these methods is used, a water-soluble salt is used as catalyst metal salt. Such a water-soluble salt contains salts of inorganic acids such as nitrates and chlorides and those of organic acids such as acetates and oxalates. Alternatively, acetylacetonate of the metal may be dissolved into an organic solvent such as acetone and the carrier may be impregnated with the solution. The carrier impregnated with an aqueous solution of the catalyst metal salt is dried at temperature between 100 and 200° C., preferably between 100 and 150° C. When the carrier is impregnated by using an organic solvent, the impregnated carrier is preferably dried at temperature higher than the boiling point of the solvent by 50 to 100° C. The baking temperature and the baking time of the dried product may be selected appropriately depending on the catalyst to be obtained. Generally, the baking temperature is between 300 and 1,300° C.

(2) Method of Manufacturing Synthesis Gas

A method of manufacturing synthesis gas according to the invention involves the use of a catalyst for manufacturing synthesis gas as described above. With this method, a catalyst layer is formed by filling a reaction vessel such as a column reactor with the catalyst, supplying feedstock gas containing hydrocarbon having 1 to 5 carbon atoms in each molecule and oxygen by way of the inlet of the reaction vessel to make it contact the catalyst layer, converting the feedstock gas into synthesis gas containing carbon monoxide (CO) and hydrogen ($H_2$) as principal ingredients in the reaction vessel and taking out the reaction product from the outlet of the reaction vessel.

Preferable examples of hydrocarbon having 1 to 5 carbon atoms in each molecule include methane, ethane, propane and butane. Natural gas containing methane as principal ingredient may preferably be used for the purpose of the invention. Oxygen-containing compounds such as alcohols, ethers and esters may also be used for the purpose of the invention. Thus, for the purpose of the invention, "hydrocarbons" include such oxygen-containing compounds.

Oxygen, air or oxygen-enriched air is used as oxygen source for the purpose of the present invention.

The feedstock gas may contain inert gas such as argon as diluent gas.

When the molar number of carbon deriving from feedstock hydrocarbon is expressed by C, the ratio of $O_2/C$ (molar ratio) in the feedstock gas is within the range from 0.3 to 0.6, preferably within the range from 0.4 to 0.6. The conversion rate of feedstock gas falls when the molar ratio is less than 0.3, whereas complete oxidation is promoted and the yield of manufacturing synthesis gas falls when the molar ratio exceeds 0.6. When alcohols, ethers and/or esters are used for feedstock gas, the supply rate of feedstock gas and that of oxygen-containing gas are regulated so as to satisfy the above requirement after the number of oxygen atoms in the total gas that is introduced into the catalyst layer is reduced to $O_2$.

The gas temperatures respectively at the inlet and at the outlet of the catalyst layer that is filled with a catalyst for manufacturing synthesis gas according to the invention are such that the gas temperature at the inlet side is between 100 and 500° C. (preferably, between 200 and 500° C., more preferably between 200 and 400° C.) while the gas temperature at the outlet side is between 600 and 1,200° C. (preferably, between 600 and 900° C., more preferably between 600 and 800° C.) when the conversion rate of feedstock gas that depends on the reaction rate and the amount of energy necessary for preheating feedstock gas is taken into consideration. The steam that is mixed with the feedstock gas can be liquefied, if partly, when the temperature is lower than 100° C. at the inlet side, whereas methane and oxygen can give rise to spontaneous ignition when the temperature exceeds 500° C. The conversion rate of methane falls to an economical disadvantage when the temperature is lower than 600° C. at the outlet side, whereas the energy consumption rate rises also to an economical disadvantage due to the need of preliminary heating when the temperature exceeds 1,200° C.

The gas pressure at the inlet of the catalyst layer is determined from the economical point of view by taking the fact into consideration that the facility including the reactor can be downsized but highly pressure-resistant equipment has to be used when a high gas pressure level is involved. Normally, the gas pressure is between 0.1 MPa and 10 MPa, preferably between 0.5 MPa and 7 MPa, most preferably between 0.5 MPa and 5 MPa.

The contact time t (sec) that is determined by dividing the volume V(m$^3$) occupied by the catalyst layer by the feedstock gas flow rate (m$^3$/sec) is between $5 \times 10^{-4}$ and $3 \times 10^{-2}$ (sec), preferably between $1 \times 10^{-3}$ and $2 \times 10^{-2}$ (sec), still more preferably between $3 \times 10^{-3}$ and $1 \times 10^{-2}$ (sec). Feedstock hydrocarbon simply passes through to reduce the conversion rate when the contact time is less than $5 \times 10^{-4}$ (sec), whereas the generated synthesis gas is consumed to also reduce the conversion rate because a reverse steam reforming reaction (CO+$3H_2 \rightarrow CH_4+H_2O$) and a reverse carbon dioxide reforming reaction ($2CO+2H_2CO_2+CH_4$) take place when the contact time exceeds $3 \times 10^{-2}$ (sec).

Any of various types of gas/solid catalytic process including the fixed bed type, the fluidized bed type, the suspended bed type and the moving bed type may be used for a synthesis gas manufacturing process using a catalyst according to the invention, although the fixed bed type is preferably adopted.

As a method of, manufacturing synthesis gas according to the invention uses a predetermined catalyst for manufacturing synthesis gas according to the invention under the above identified manufacturing conditions, it is possible to realize a direct partial oxidation system, which is a direct conversion system (emitting heat at a rate of about 30 kJ/mol) as expressed by the formula (1) below.

$$CH_4 + 1/2 O_2 \rightarrow CO + 2H_2 \qquad (1)$$

On the basis of the above formula, it is possible to directly manufacture synthesis gas with a $H_2$/CO molar ratio=2 or closer to it so as to provide methanol, FT synthesis and DME feedstock without requiring gas separation of hydrogen from generated gas.

EXAMPLES

Now, the present invention will be described in greater detail by way of examples.

Examples 1 through 6, Comparative Examples 1 through 16

Magnesium hydroxide ($Mg(OH)_2$), zirconium oxide ($ZrO_2 \cdot 2H_2O$), cerium hydroxide ($Ce(OH)_4 \cdot 2H_2O$) and calcium carbonate ($CaCO_3$) that were in a powdery state were weighed and taken to produce the composition of the carrier components of each of Examples 1 through 6 and Comparative Example 1 through 15 as listed in Table 1 below, to which 3.5 wt % powdery carbon was added, and mixed in a motor to produce a uniform mixture.

The obtained powdery mixtures were molded by compression to form disks having a diameter of 2 cm under pressure of 3 ton/cm² and baked in the atmosphere at 1,100 to 1,200° C. for 6 hours.

Each of the products of compression molding was crushed to pieces to obtain a carrier of a particle size of 0.8 mm to 1.1 mm. The moisture retention capacity of the obtained carrier was determined in advance and the carriers were fully impregnated with respective aqueous solutions of rhodium acetate to the limit as defined by the moisture retention capacity. At this time, the concentrations in the aqueous solutions of rhodium were regulated in such a way that the rhodium concentrations in the carriers after secondary baking as mentioned below got to 2,000 weight ppm (Examples 1 through 4, Comparative Examples 1 through 16), 10,000 weight ppm (Example 5) and 700 weight ppm (Example 6).

The carriers impregnated with the respective aqueous solutions of rhodium were dried in the atmosphere at 50° C. for 16 hours and subsequently baked for secondary baking in the atmosphere at 950° C. for 3 hours.

After the secondary baking, 0.84 ml of each of the catalyst was filled in a reaction tube having an inner diameter of 16 mm and arranged in an annular electric furnace. A thermowell was arranged at the center of the reaction tube to observe the temperature distribution of the catalyst layer at the front and the back thereof. The catalyst was reduced by hydrogen in advance at 950° C. for an hour and feedstock gas containing oxygen, methane and argon at a ratio of $O_2:CH_4:Ar=15:30:55$ (mol %) was supplied under conditions including pressure of 0.1 MPa and GHSV=400,000 (l/hr) (contact time=9 ms). The synthesis gas manufacturing test was continued with gas temperature of 650±2° C. as observed at the catalyst layer outlet. The composition of the produced gas was held constant during the test period of about 10 hours. The methane conversion rate, the $H_2$ selectivity and the CO selectivity as defined below were determined from the outflow rate of the produced gas and the contents of CO, $CO_2$ and $H_2$ obtained by gas chromatography analysis.

Methane conversion rate=(methane inflow rate−methane outflow rate)/(methane inflow rate)

Hydrogen selectivity=(hydrogen outflow rate×0.5)/(methane inflow rate−methane outflow rate)

CO selectivity=(CO outflow rate)/(methane inflow rate−methane outflow rate)

(the unit for each gas inflow rate and each outflow rate is mol/hr)

Additionally, after the end of the test, the carbon content of each catalyst was measured to determine the weight of the increased carbon (carbon deposition rate).

The results of the experiment are summarily listed in Table 1.

From the results summarized in Table 1, it is clear that a catalyst according to the invention and prepared by using a carrier containing the predetermined three ingredients shows a high conversion rate, a high selectivity and an excellent resistance against carbon deposition (a small increase in the amount of carbon) (Examples 1 through 6).

As seen from the data on Comparative Examples 1 through 4, it is clear that both the conversion rate and the selectivity falls when the molar ratio of the second ingredient relative to the first ingredient and the molar ratio of the third ingredient relative to the first ingredient go out of the respective ranges between 0.02 and 0.40 and between 0.04 and 1.5.

Additionally, as seen from the data on Comparative Examples 5 through 9, while the addition of the third ingredient ($ZrO_2$) to the first ingredient (MgO) tends to raise both the $H_2$ selectivity and the CO selectivity, the methane conversion rate and the resistance against carbon deposition are not satisfactory. The addition of the third ingredient ($ZrO_2$) accelerates the carbon deposition from the viewpoint of its relationship with the first ingredient (MgO).

Still additionally, as seen from the data on Comparative Examples 10 through 14, while the addition of the second ingredient ($CeO_2$) to the first ingredient (MgO) tends to improve the methane conversion, the $H_2$ selectivity and the CO selectivity fall slightly and the resistance against carbon deposition is not satisfactory.

Furthermore, it is clear that the conversion rate falls remarkably when a carrier prepared by using the second ingredient ($CeO_2$) and the third ingredient ($ZrO_2$) (Comparative Example 15).

Finally, when an $Al_2O_3$ carrier that is conventionally used as carrier in a catalyst for partial oxidation is used (Comparative Example 16), the methane conversion rate, the $H_2$ selectivity and the CO selectivity are not satisfactory and the resistance against carbon deposition is low so that carbon is deposited to a large extent.

Thus, it is clear from the above-described results of the experiment that all the catalysts of the above examples performed very excellently. Additionally, a high conversion rate was achieved at gas temperature of about 650° C. in all the examples. This reveals that the reforming equilibrium value of 66% at 650° C. is surpassed and hence a method of manufacturing synthesis gas according to the invention provides a high thermal efficiency if compared with conventional oxygen reforming processes including the popular ATR process.

Example 7

A doughnut-shaped porous body of alumina foam (20 cells per inch, available from Kurosaki Harima) having an outer diameter of 16 mm, an inner diameter of 7 mm and a height of 5 mm was prepared for the substrate of a carrier.

The porous body was dipped in a slurry containing magnesium hydroxide (MgO content after strongly heating: 97.8%), cerium oxide (98%) and zirconium hydroxide ($ZrO_2 \cdot nH_2O:ZrO_2$ content: 73%) as oxides to a ratio of $MgO/CeO_2/ZrO_2=33.3/33.3/33.3$ (weight %) and pulled up for drying. This operation cycle was repeated for several times.

Then, the slurry-impregnated porous body was baked in air at 1,200° C. to form an overcoat film containing three ingredients of MgO/CeO$_2$/ZrO$_2$ on the surface (preparation of a carrier).

Thereafter, the capacity of water to be retained by the carrier was determined in advance and the carrier was impregnated with an amount of aqueous solution of rhodium acetate that is equal to the determined amount of water to be retained by the carrier. The concentration of rhodium acetate in the aqueous solution was so regulated that the rhodium concentration in the carrier would become equal to 2,000 weight ppm (equivalent to Rh=3.8×10$^{-5}$ mol/m$^2$) after the secondary baking step.

Subsequently, the carrier impregnated with aqueous solution of Rh was subjected to secondary baking at 400° C. for 6 hours to obtain the catalyst of this example.

The prepared catalyst was filled in a reaction tube having an inner diameter of 16 mm and arranged in an annular electric furnace. Then, a synthesis gas manufacturing test was conducted as in Examples 1 through 6 and Comparative Examples 1 through 16 (except that the test time was 3 hours and the gas temperature at the outlet of the catalyst layer was 900° C.) to determine the methane conversion rate, the H$_2$ selectivity, the CO selectivity and the increase in the amount of carbon as in the preceding experiment.

The obtained results are summarized in Table 2.

Comparative Example 17

A specimen of Example 17 was prepared as in Example 7 except that only alumina foam (20 cells per inch, available from Kurosaki Harima) was used for the carrier and an overcoat film of MgO/CeO$_2$/ZrO$_2$ was not used. The prepared specimen was subjected to a similar synthesis gas manufacturing test (except that the gas temperature at the outlet of the catalyst layer was 925° C.).

The obtained results are summarized in Table 2.

From the results listed in Table 2, it is clear that a catalyst prepared by using a carrier of alumina foam having an overcoat film of MgO/CeO$_2$/ZrO$_2$ and carrying Rh shows a high conversion rate, a high selectivity for both H$_2$ and CO and a high resistance against carbon deposition (a small increase in the amount of carbon).

Example 8

An experiment was conducted to verify the advantage of a catalyst according to the invention in terms of pressure loss of the catalyst.

The pressure loss of a foam catalyst was measured in the experiment. More specifically, a catalyst was prepared from a molded product of alumina foam having a diameter of 80 mm and a thickness of 50 mm by way of the process of Example 7 and mounted on a tube with an inner diameter or 80 mm. Thereafter, the outlet of the tube was exposed to the atmosphere and air was made to flow through it to observe the pressure loss. It was found that the pressure loss at linear velocity=4.8 m/sec was 0.04 MPa.

Comparative Example 18

For the purpose of comparison, the pressure loss of a catalyst layer was computationally determined for a situation where a ring-shaped catalyst (16 mm×16 mm) was used as object for comparison and filled in a reaction tube under assumed conditions that the pressure at the outlet of the catalyst layer was atmospheric pressure, the contact time was 10 msec (linear velocity=4.8 m/sec) and the height of the catalyst layer was 50 mm. The estimation formula described in the catalyst notebook that is issued from Sud-Chemie Japan was used for the computation.

As a result, the pressure loss using the object for comparison was found to be 0.3 MPa.

As clearly seen from the above results, a catalyst for catalytic partial oxidation according to the invention shows a high conversion rate, a high selectivity for both H$_2$ and CO and a high resistance against carbon deposition (a small increase in the amount of carbon) if compared with any known catalysts for catalytic partial oxidation and makes it possible to realize a catalytic partial oxidation process that requires a very high gas flow rate that can reduce the contact time to less than 30 msec because of the low pressure loss.

TABLE 1

| Sample No. | Carrier ingredients wt % (unit of values in ( ): mol/100 g) | | | | | Active metal Rh (ppm) | Second/first ingredient (mol/mol) | Third/First ingredient (mol/mol) | Methane conversion rate (%) | H$_2$ selectivity (%) | CO selectivity (%) | Increased amount of carbon of used catalyst (wt %) |
|---|---|---|---|---|---|---|---|---|---|---|---|---|
| | MgO | ZrO$_2$ | CeO$_2$ | CaO | Al$_2$O$_3$ | | | | | | | |
| Ex. 1 | 33 (0.819) | 33 (0.268) | 33 (0.192) | — | — | 2000 | 0.234 | 0.327 | 79.9 | 91.1 | 91.2 | 0.005 |
| Ex. 2 | 40 (0.993) | 40 (0.325) | 20 (0.116) | — | — | 2000 | 0.117 | 0.327 | 79.5 | 90.2 | 90.7 | 0.003 |
| Ex. 3 | 35 (0.863) | 50 (0.406) | 15 (0.087) | — | — | 2000 | 0.100 | 0.467 | 79.0 | 91.2 | 91.4 | 0.003 |
| Ex. 4 | — | 33 (0.268) | 33 (0.192) | 33 (0.588) | — | 2000 | 0.326 | 0.455 | 78.8 | 90.5 | 91.5 | 0.004 |
| Ex. 5 | 33 (0.819) | 33 (0.268) | 33 (0.192) | — | — | 10000 | 0.234 | 0.327 | 80.0 | 91.2 | 91.5 | 0.006 |
| Ex. 6 | 33 (0.819) | 33 (0.268) | 33 (0.192 | — | — | 700 | 0.234 | 0.327 | 80.0 | 91.2 | 91.5 | 0.002 |
| Com. Ex. 1 | 62 (1.538) | 33 (0.268) | 5 (0.029) | — | — | 2000 | 0.019 | 0.174 | 69.5 | 89.9 | 91.1 | 0.005 |
| Com. Ex. 2 | 33 (0.819) | 10 (0.081) | 57 (0.331) | — | — | 2000 | 0.404 | 0.099 | 76.3 | 89.9 | 89.6 | 0.003 |
| Com. Ex. 3 | 50 (1.241) | 5 (0.041) | 45 (0.261) | — | — | 2000 | 0.211 | 0.033 | 79.0 | 88.5 | 89.0 | 0.006 |

TABLE 1-continued

| Sample No. | Carrier ingredients wt % (unit of values in ( ): mol/100 g) | | | | | Active metal Rh (ppm) | Second/first ingredient (mol/mol) | Third/First ingredient (mol/mol) | Methane conversion rate (%) | $H_2$ selectivity (%) | CO selectivity (%) | Increased amount of carbon of used catalyst (wt %) |
|---|---|---|---|---|---|---|---|---|---|---|---|---|
| | MgO | $ZrO_2$ | $CeO_2$ | CaO | $Al_2O_3$ | | | | | | | |
| Com. Ex. 4 | 15 (0.372) | 70 (0.568) | 15 (0.087) | — | — | 2000 | 0.234 | 1.527 | 74.4 | 86.2 | 91.2 | 0.053 |
| Com. Ex. 5 | — | 100 (0.812) | — | — | — | 2000 | — | — | 60.6 | 85.0 | 93.8 | 0.215 |
| Com. Ex. 6 | 10 (0.248) | 90 (0.731) | — | — | — | 2000 | — | 2.944 | 72.6 | 87.1 | 90.2 | 0.139 |
| Com. Ex. 7 | 50 (1.241) | 50 (0.406) | — | — | — | 2000 | — | 0.327 | 68.8 | 93.8 | 92.0 | 0.019 |
| Com. Ex. 8 | 90 (2.233) | 10 (0.081) | — | — | — | 2000 | — | 0.036 | 69.2 | 91.1 | 90.6 | 0.011 |
| Com. Ex. 9 | 100 (2.481) | — | — | — | — | 2000 | — | — | 71.9 | 91.1 | 89.5 | 0.008 |
| Com. Ex. 10 | — | — | 100 (0.581) | — | — | 2000 | — | — | 64.4 | 79.6 | 84.1 | 0.006 |
| Com. Ex. 11 | 10 (0.248) | — | 90 (0.523) | — | — | 2000 | 2.107 | — | 77.9 | 90.6 | 89.2 | 0.007 |
| Com. Ex. 12 | 50 (1.241) | — | 50 (0.291) | — | — | 2000 | 0.234 | — | 79.2 | 90.2 | 89.4 | 0.007 |
| Com. Ex. 13 | 70 (1.737) | — | 30 (0.174) | — | — | 2000 | 0.100 | — | 77.0 | 88.0 | 89.1 | 0.007 |
| Com. Ex. 14 | 90 (2.233) | — | 10 (0.058) | — | — | 2000 | 0.026 | — | 76.5 | 89.8 | 87.6 | 0.008 |
| Com. Ex. 15 | — | 50 (0.406) | 50 (0.291) | — | — | 2000 | — | — | 65.2 | 84.5 | 90.0 | 0.005 |
| Com. Ex. 16 | — | — | — | — | 100 (0.98) | 2000 | — | — | 75.0 | 84.1 | 90.7 | 0.099 |

TABLE 2

| Sample No. | Carrier | Active metal | Gas temp. at outlet of catalyst layer (° C.) | Methane conversion rate (%) | $H_2$ selectivity (%) | CO selectivity (%) | Increased amount of carbon of used catalyst (wt %) |
|---|---|---|---|---|---|---|---|
| Example 7 | $MgO/CeO_2/ZrO_2$ coating alumina foam | Rh: $3.8 \times 10^{-5}$ mol/m$^2$ | 900 | 61.1 | 87.5 | 92.1 | 0.02 |
| Comparative example 17 | Alumina foam | Rh: $3.8 \times 10^{-5}$ mol/m$^2$ | 925 | 45.0 | 61.0 | 90.9 | 0.09 |

The invention claimed is:

1. A catalyst for manufacturing synthesis gas containing carbon monoxide and hydrogen as principal ingredients from feedstock gas containing hydrocarbon having 1 to 5 carbon atoms in each molecule and oxygen, characterized in that
   the catalyst for manufacturing synthesis gas has an aluminum-free carrier and a catalyst metal carried by the carrier;
   said catalyst metal comprising at least a Group VIII metal including at least rhodium;
   said carrier containing a first ingredient, a second ingredient and a third ingredient;
   said first ingredient being an oxide of at least an alkaline earth metal including at least magnesia;
   said second ingredient being an oxide of at least an element selected from the group of scandium, yttrium and lanthanoids including at least ceria;
   said third ingredient being zirconia or a substance containing zirconia as principal ingredient and having a solid electrolytic property,
   wherein the molar ratio of said second ingredient relative to said first ingredient is between 0.10 and 0.25 and the molar ratio of said third ingredient relative to said first ingredient is between 0.3 and 0.6.

2. The catalyst according to claim 1, wherein
   said first ingredient is magnesia or magnesia that contains calcia.

3. The catalyst according to claim 1, wherein
   said second ingredient is an oxide of at least an element selected from the group of scandium, yttrium, lanthanum, cerium, praseodymium, neodymium and samarium, including at least ceria.

4. The catalyst according to claim 3, wherein
   said second ingredient is an oxide of cerium, including at least ceria.

5. The catalyst according to claim 1, wherein
   said third ingredient is at least a substance selected from the group of zirconia, calcium-stabilized zirconia, magnesium-stabilized zirconia, yttrium-stabilized zirconia, scandium-stabilized zirconia and cerium-stabilized zirconia.

6. The catalyst according to claim 5, wherein
   said third ingredient is zirconia or calcium-stabilized zirconia.

7. The catalyst according to claim 1, wherein
said carrier comprises a porous body that operates as substrate for the carrier and an overcoat film formed on the porous body by coating and said overcoat film contains said first ingredient, said second ingredient and said third ingredient.

8. The catalyst according to claim 7, wherein
said porous body is made of at least a substance selected from ceramic foam and ceramic honeycomb.

9. The catalyst according to claim 8, wherein
said porous body is made of ceramic foam and has a mesh structure of 10 to 40 cells per inch.

10. The catalyst according to claim 8, wherein
said porous body is made of ceramic honeycomb and has a structure of 100 to 400 cells per square inch.

11. The catalyst according to claim 1, wherein
said Group VIII metal is at least a metal selected from the group of rhodium, platinum, palladium, ruthenium and iridium, including at least rhodium.

12. The catalyst according to claim 11, wherein
said Group VIII metal is rhodium.

13. The catalyst according to claim 1, wherein
said Group VIII metal is carried by the carrier at a rate of 100 to 50,000 weight ppm per unit weight of the carrier.

14. The catalyst according to claim 1, wherein
said Group VIII metal is carried by the carrier at a rate of $2 \times 10^{-7}$ to $5 \times 10^{-3}$ mol/m$^2$ per unit surface area of the carrier.

15. A method of manufacturing synthesis gas containing carbon monoxide and hydrogen as principal ingredients by causing feedstock gas containing hydrocarbon having 1 to 5 carbon atoms in each molecule and oxygen to contact a catalyst for manufacturing synthesis gas, as recited in claim 1.

16. The method according to claim 15, characterized in that,
when the molar number of carbon deriving from feedstock hydrocarbon is expressed by C, the ratio of $O_2/C$ in the feedstock gas is within the range from 0.3 to 0.6, the gas temperature at the inlet of the catalyst layer filled with the catalyst for manufacturing synthesis gas is so regulated as to be between 100 and 500° C. and the gas temperature at the outlet of the catalyst layer is so regulated as to be between 600 and 1200° C. while the gas pressure at the inlet of the catalyst layer is so regulated as to be between 0.1 MPa and 10 MPa.

17. The method according to claim 15, characterized in that the contact time ($\tau$) is defined to be within a range between $5 \times 10^{-4}$ and $3 \times 10^{-2}$ sec.

* * * * *